(12) United States Patent
Robinson

(10) Patent No.: US 10,673,374 B2
(45) Date of Patent: *Jun. 2, 2020

(54) SOLAR PANEL MODULE MOUNTING BRACKET

(71) Applicant: Zia Mounting Solutions, LLC, Lincoln, CA (US)

(72) Inventor: Chad Robinson, Folsom, CA (US)

(73) Assignee: Unirac Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,683

(22) Filed: Mar. 20, 2019

(65) Prior Publication Data

US 2019/0222164 A1 Jul. 18, 2019

Related U.S. Application Data

(63) Continuation of application No. 15/693,363, filed on Aug. 31, 2017, now Pat. No. 10,243,506, which is a continuation of application No. 15/339,828, filed on Oct. 31, 2016, now Pat. No. 9,762,177.

(51) Int. Cl.
| | |
|---|---|
| *F16B 43/00* | (2006.01) |
| *H02S 20/23* | (2014.01) |
| *F16J 15/02* | (2006.01) |
| *E04D 1/30* | (2006.01) |
| *E04D 1/36* | (2006.01) |
| *F24S 25/61* | (2018.01) |

(52) U.S. Cl.
CPC .............. *H02S 20/23* (2014.12); *E04D 1/30* (2013.01); *E04D 1/36* (2013.01); *F16J 15/022* (2013.01); *E04D 2001/307* (2013.01); *E04D 2001/308* (2013.01); *F24S 25/61* (2018.05); *Y02B 10/12* (2013.01)

(58) Field of Classification Search
CPC .................. F16B 43/001; F16B 5/0258; F24J 2002/5294; F24J 2/5245; F24S 25/61; F24S 2025/021; Y02B 10/20
See application file for complete search history.

(56) References Cited

U.S. PATENT DOCUMENTS

| | | | |
|---|---|---|---|
| 3,180,594 A | 4/1965 | Connell | |
| 4,232,496 A | 11/1980 | Warkentin | |
| 4,266,683 A * | 5/1981 | Sellinger | H02G 3/088 174/650 |
| 4,306,708 A | 12/1981 | Gassaway et al. | |
| 4,432,680 A | 2/1984 | Molina | |
| 4,747,738 A | 5/1988 | Duran | |

(Continued)

OTHER PUBLICATIONS

Office Action for U.S. Appl. No. 15/693,363, dated Jan. 30, 2018, Robinson, "Roof Sealing System", 9 pages.

(Continued)

*Primary Examiner* — Brian E Glessner
*Assistant Examiner* — Daniel J Kenny
(74) *Attorney, Agent, or Firm* — Lee & Hayes, P.C.

(57) ABSTRACT

A seal includes an elongated body having a first end and a second end, an interior surface and an exterior surface, and a hole extending from the first end to the second end. The hole defines the interior surface of the body. The seal further includes a first flange disposed adjacent the hole on the first end of the body and a second flange disposed adjacent the hole on the second end of the body.

13 Claims, 7 Drawing Sheets

(56) References Cited

U.S. PATENT DOCUMENTS

| | | | |
|---|---|---|---|
| 4,906,153 A | 3/1990 | Duran | |
| 5,073,070 A | 12/1991 | Chang | |
| 6,591,801 B1 | 7/2003 | Fonville | |
| 7,073,227 B2 | 7/2006 | Fukushima | |
| 7,762,027 B1 | 7/2010 | Wentworth et al. | |
| 8,122,648 B1 | 2/2012 | Liu | |
| 8,146,299 B2 | 4/2012 | Stearns et al. | |
| 8,151,522 B2 | 4/2012 | Stearns et al. | |
| 8,153,700 B2 | 4/2012 | Stearns et al. | |
| 8,171,690 B2 | 5/2012 | Ghatikar et al. | |
| 8,209,914 B2 | 7/2012 | Stearns et al. | |
| 8,245,454 B2 | 8/2012 | Stearns et al. | |
| 8,246,281 B2 | 8/2012 | Gulistan | |
| 8,272,174 B2 | 9/2012 | Stearns et al. | |
| 8,448,405 B2 * | 5/2013 | Schaefer | E04C 3/06 52/710 |
| 8,701,354 B2 | 4/2014 | Stearns et al. | |
| 8,713,858 B1 | 5/2014 | Xie | |
| 8,733,718 B2 * | 5/2014 | Corsi | E04B 1/40 248/205.1 |
| 9,062,897 B2 | 6/2015 | West et al. | |
| 9,127,464 B2 | 9/2015 | Stearns et al. | |
| 9,134,044 B2 | 9/2015 | Stearns et al. | |
| 9,394,693 B2 | 7/2016 | Daniels | |
| 9,422,721 B2 | 8/2016 | Stearns et al. | |
| 9,422,723 B2 | 8/2016 | Stearns et al. | |
| 9,447,988 B2 | 9/2016 | Stearns et al. | |
| 9,755,571 B2 | 9/2017 | Almy et al. | |
| 9,819,303 B2 * | 11/2017 | Ash | F24S 25/61 |
| 2006/0216132 A1 | 9/2006 | Le | |
| 2011/0014010 A1 | 1/2011 | DeGraan | |
| 2016/0134230 A1 | 5/2016 | Meine et al. | |
| 2018/0123502 A1 | 5/2018 | Robinson | |

OTHER PUBLICATIONS

Office Action for U.S. Appl. No. 15/339,828, dated Mar. 17, 2017, Robinson, "Roof Sealing System", 12 pages.

Office Action for U.S. Appl. No. 15/693,363, dated Aug. 10, 2018, Robinson, "Roof Sealing System", 9 pages.

* cited by examiner

SOLAR PANEL MODULE MOUNTING BRACKET

CROSS REFERENCE TO RELATED PATENT APPLICATIONS

This application is a continuation of, and claims priority to, U.S. application Ser. No. 15/693,363, filed Aug. 31, 2017, titled "Roof Sealing System," which is a continuation of U.S. application Ser. No. 15/339,828, filed Oct. 31, 2016, titled "Roof Sealing System," and which is now issued as U.S. Pat. No. 9,762,177, the entire contents of which are incorporated herein by reference.

BACKGROUND

Solar panels are becoming increasingly popular to produce electricity. To support solar panels, roof racking systems may be used. Roof racking systems are generally mounted to an existing structure of a house or building, such as beams or plywood underlying roofing shingles or tiles. Commonly, fasteners are used to permit such attachment. Furthermore, the roof racking systems may need to mirror the pre-existing tile structure, and thus may require a tile replacement system using a tile flashing. Such replacement systems may introduce another level of complexity to the structure.

As the exterior, and prominently the roof, of a structure undergoes wet environments, such as rain, sleet, or snow, roof racking systems attached to the house must prevent water and other moisture from leaking into the interior of the structure. In particular, the beams or plywood must be protected from water damage. As fasteners are used to attach the roof racking system, the fasteners frequently pierce the roof structure, creating a potential passageway whereby water may enter the structure of the building. Accordingly, to protect against water damage, among other methods, washers and/or other seal elements are commonly placed around the fastener and/or the aperture created by the fastener to prevent moisture from flowing into or entering a hole in which the fastener is situated. However, washers and seals sometimes fail to adequately protect against water damage.

Additionally, conventional roof racking systems may use one or more small, loose components that are provided individually for on-site, time-of-install integration. Due to the nature of the racking systems, installation of the systems frequently occurs in hazardous environments, such as on a roof of a building. In such a situation, a system that includes small, loose components may cause unnecessary delays and annoyance whenever a loose component is inadvertently dropped. Moreover, such a system may increase the risk to a user's safety when the user tries to recover a dropped component, in that the user could lose his/her balance and fall.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

SUMMARY

As briefly discussed above, roof racking systems are frequently used to support solar panels positioned on a roof or other surface receiving sunlight. The racking systems may be mounted or otherwise attached to an existing structure of a house or building, for example, through the use of fasteners. The fasteners may be disposed through a bracket and/or in addition, a piece of flashing, and secured into a structure of the roof, such as, a beam or sheet of plywood. As the fastener traverses the roofing structure creating an attachment point, the roofing structure may be compromised and may allow for water to pass through or around the attachment point(s). For instance, water may enter around a hole created by the fastener when attaching the bracket to the roofing structure.

Accordingly, the present disclosure is directed to a roof racking system for assisting in supporting solar panels or other structures while maintaining the integrity and utility of the roofing structure. In some instances, the system may include a flashing, a bracket used to support and secure the flashing, a fastener to attach the flashing and bracket to a structure of a house or building, and a seal to minimize the permeation of water entering the structure via the fastener attachment point. It is further envisioned that, collectively, the flashing, the bracket, and the seal may work in unison to prevent or inhibit water from entering a hole of a fastener attachment point.

Moreover, while illustrated and described as being useful for attaching solar panels, the system discussed herein may be used to attach other apparatuses as well.

Additional details regarding the features of the roof racking system are described herein below.

DETAILED DESCRIPTION

Figure 1:
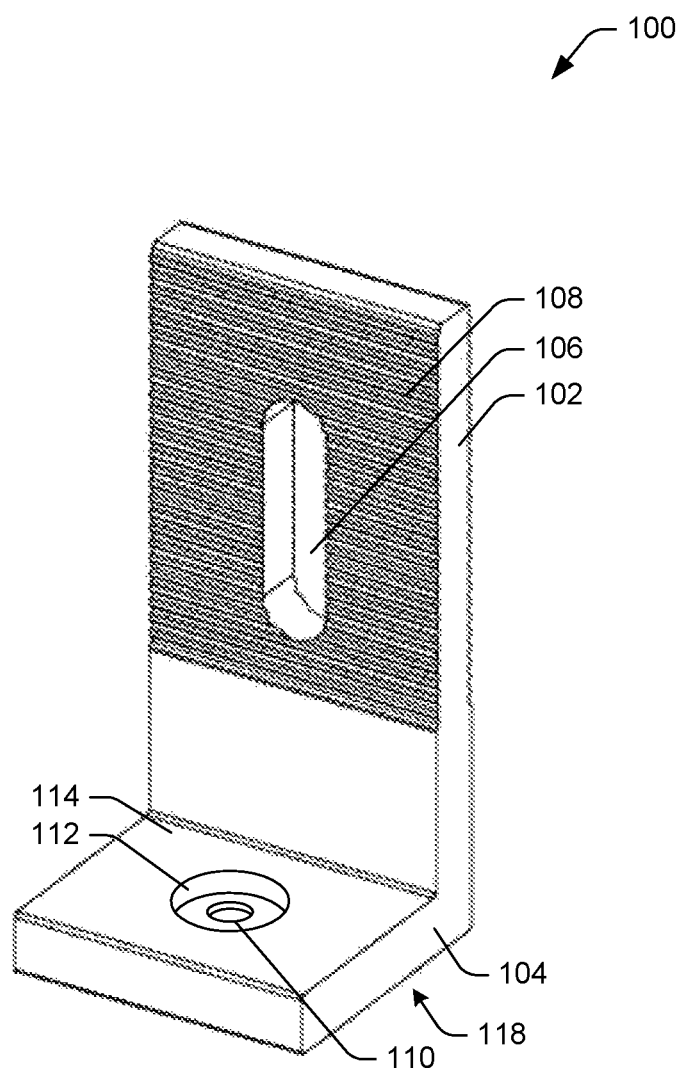
FIG. 1 illustrates a perspective view of a bracket of a roof racking system according to an embodiment of the application.

FIG. 1 depicts a perspective view of a bracket 100 used in the roof racking system according to an embodiment of the instant application. In general, bracket 100 may be placed adjacent to a surface on which the roof racking system is to be applied and secured to the surface thereof via a fastener (not shown) traversing through bracket 100. Fasteners used to attach bracket 100 may include, for example, bolts, screws, etc. Furthermore, bracket 100 may be mounted to any of a plurality of varying surfaces used in roofing applications such as plywood, wood shakes, shingles, tiles, tile flashing, metal/tin roofing sheets, vinyl, or other barriers serving the purpose of a roof. In addition, bracket 100 may be formed of metal, plastic, or any other suitable material.

Referring to the specifics of FIG. 1, bracket 100 may include a first member 102 and a second member 104. In some instances, as illustrated, bracket 100 may have an L-shape configuration. However, other shapes may also be instituted. In addition, first member 102 and second member 104 may be of similar or different thicknesses with respect to one another.

In use, first member 102 may support or be in contact with a strut (not shown) or other mechanism used to support a solar panel or other apparatus. For example, first member 102 may have a slot 106 traversing a portion of first member 102. In an embodiment, slot 106 may extend towards second member 104 as shown. Alternatively, slot 106 may extend across a width direction of first member 102 (not shown), or may simply be a circular aperture (not shown), or have varying radial dimensions.

Slot 106 may allow a fastener, or other connector to pass therethrough and connect to the strut used to support a solar panel or other apparatus. Inasmuch as slot 106 extends longitudinally along first member 102, a position of the strut may be variably adjusted along first member 102 at different positions within slot 106. For instance, a fastener connected to the strut may slide within slot 106 to be positioned, and thereafter, may be tightened, thereby securing the strut to first member 102 via the fastener.

In addition, grooves 108 may extend across a front or a back surface of first member 102 to assist the fastener in securing the strut. That is, in some instances, grooves 108 may be in contact with a head of a bolt or other fastener to prevent the fastener from becoming loose and sliding down slot 106. Grooves 108 may extend either partially, or fully, across the width of the front or back surface of first member 102. For instance, in an embodiment, grooves 108 may surround slot 106 where the fastener is to be in contact with first member 102. Moreover, rather than extending across the entire front or back surface, grooves 108 may surround only a perimeter of slot 106 at or up to an offset distance. In some instances, the front or back surface of first member 102 may be smooth or textureless, or grooves 108 may only be included on either one of the front or back surface of first member 102. Furthermore, grooves 108 may extend partially or completely down a lengthwise direction of first member 102, towards second member 104.

While shown as extending perpendicularly across first member 102, grooves 108 may follow any pattern or orientation. For instance, grooves 108 may zig-zag across the front or back surface of first member 102.

As depicted, second member 104 forms an L-shape with the first member 102 and is configured to connect bracket 100 to a housing or roof structure. In some instances, shapes other than L-shaped brackets are contemplated, and the L-shaped bracket shown is an example of many possibilities according to different needs. Second member 104 may extend at a substantially perpendicular angle relative to first member 102. Other angles, however, may be implemented, for instance, to adjust the position or orientation of the roof racking system. Moreover, first member 102 and second member 104 may be molded or formed together, or alternatively, may be joined together through fasteners, welding, adhesion, etc.

As described above, second member 104 extends from first member 102. Second member 104 may have a hole 110 extending therethrough via which a fastener may pass to secure bracket 100. The fastener, as mentioned previously, may be used to attach bracket 100 to a roof or other structure. While hole 110 is shown as being circular, other shape profiles are contemplated. For instance, hole 110 may be square-shaped.

Figure 2:
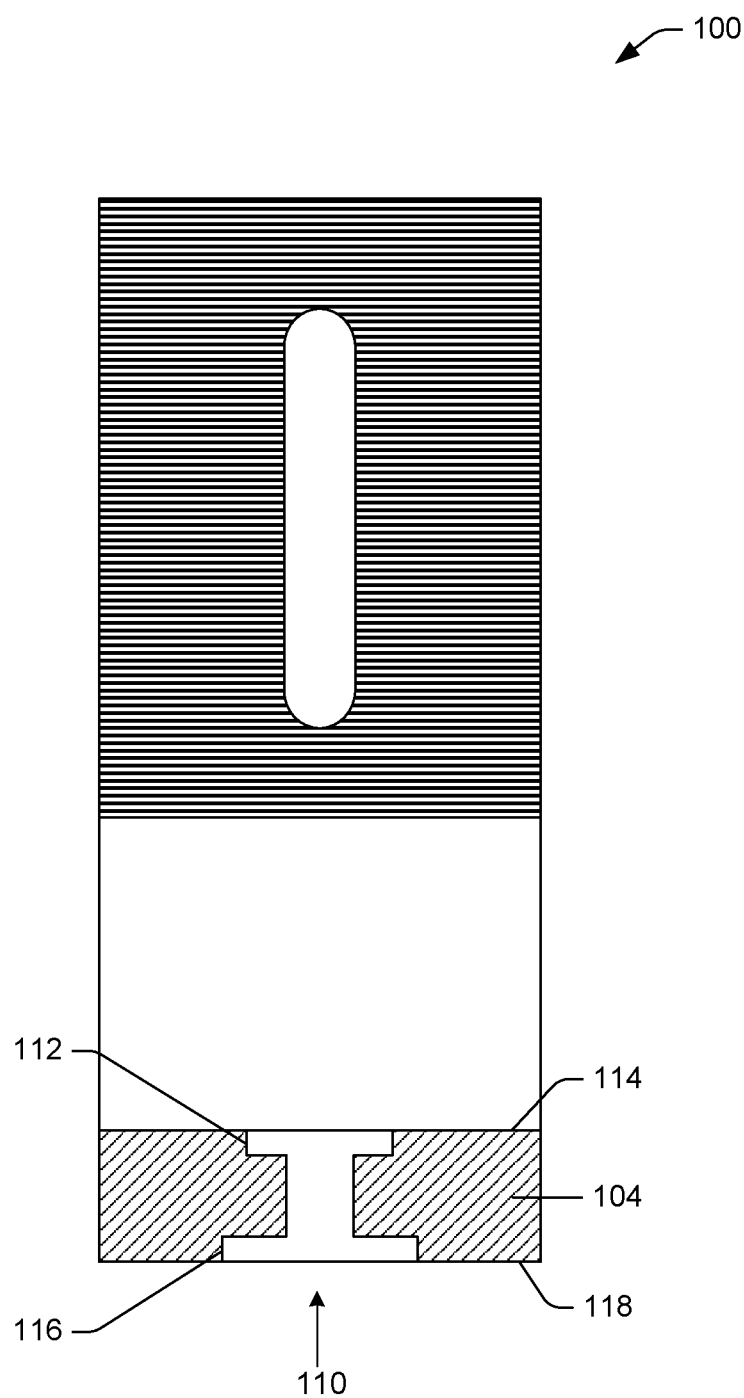
FIG. 2 illustrates a front cross-sectional view of the bracket of FIG. 1 according to an embodiment of the application.

Discussed in more detail in FIG. 2, second member 104 may also have a first counterbore 112 on first surface 114 of second member 104. In addition, a second counterbore 116 (not shown in FIG. 1) may be on the second surface 118 (pointing to the surface not visible) of second member 104.

Referring to FIG. 2, a cross-sectional view of bracket 100 of FIG. 1 is shown. As alluded to previously, second member 104 may have first surface 114 and a second surface 118. Hole 110, may extend between first surface 114 and second surface 118. A first counterbore 112 may be included on first surface 114, while a second counterbore 116 may be included on second surface 118. First counterbore 112 and second counterbore 116 may extend into first surface 114 and second surface 118, respectively, at similar or different depths. In some instances, first counterbore 112 and second counterbore 116 may extend into second member 104 at predetermined depths to receive a seal (discussed in more detail later). That is, the seal may be seated in one or both of first counterbore 112 and second counterbore 116. Note, however, that while first counterbore 112 and second counterbore 116 are illustrated and described in FIGS. 1 and 2 as being circular or a disc-shaped, in some instances not shown, corresponding counterbores may be formed having other shapes corresponding to the seal.

As first counterbore 112 and second counterbore 116 are recessed into surfaces 114 and 118, respectively, hole 110 extends therebetween to create a passage wherein a fastener may extend. In addition, as discussed herein below, hole 110 may be at least partially filled by a portion of the seal. Furthermore, in some instances, first counterbore 112 and second counterbore 116 may have similar or different shapes and sizes. As shown, first counterbore 112 may be sized differently than second counterbore 116. For instance, second counterbore 116 may be configured to have a larger diameter compared to that of first counterbore 112 in order to assist in shedding water or other moisture away from a fastener hole in a surface, for example a roof, created by a fastener used to support bracket 100.

Figure 3:
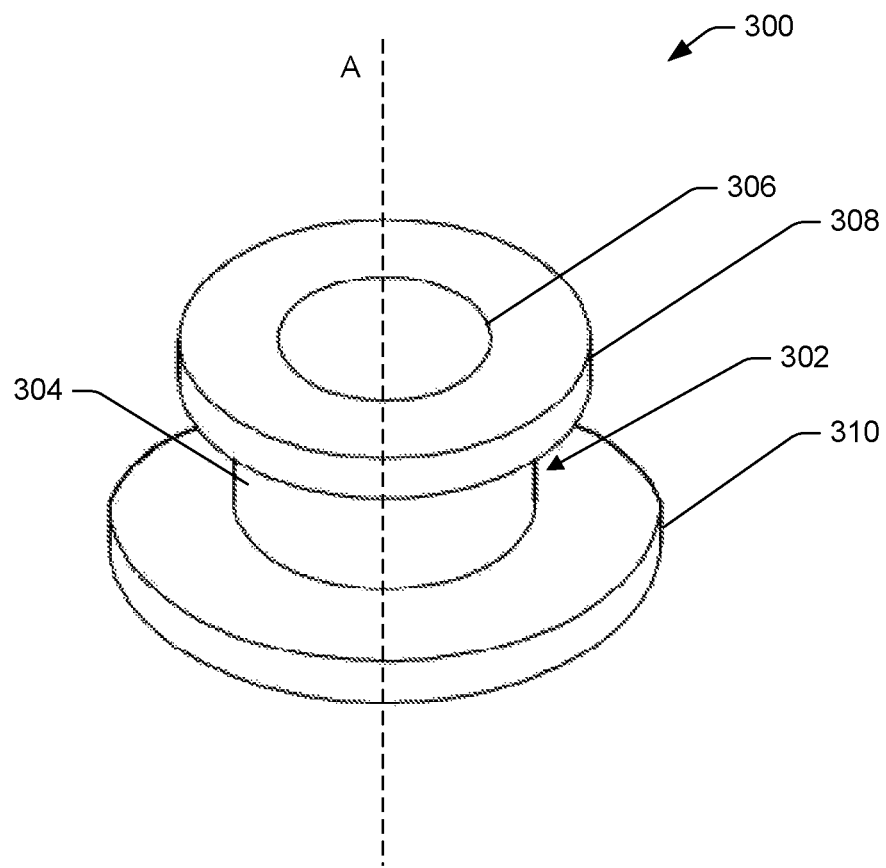
FIG. 3 illustrates a perspective view of a seal of a roof racking system according to an embodiment of the application.

FIG. 3 illustrates a perspective view of a seal 300 implemented in the roof racking system, according to an embodiment of the instant application. As previously mentioned, seal 300 may prevent water from traversing hole 110 of second member 104, and/or from entering fastener hole used to support bracket 100. To prevent seepage of water or other liquids, seal 300 may be manufactured from any suitable material, such as ethylene propylene-diene monomer (EPDM), or other rubber, plastics, and polymers.

Seal 300 may generally have an elongated body 302 formed of a material having properties that allow seal 300 to be manipulated for insertion into and positioned within hole 110 of second member 104. Specifically, seal 300 may be formed of a flexible, yet resilient material. Body 302 may generally have a tubular, elongated shape. As depicted, body 302 is cylindrical, however, in some instances, body 302 may be formed in other shapes, such as square-shaped, for example.

Being tubular, body 302 has an exterior surface 304 and an interior surface 306. When inserted into bracket 100, exterior surface 304 may contact the walls or sides of hole 110. In some instances, exterior surface 304 may fit snuggly or tightly within hole 110, providing a water tight seal and preventing water from traversing down hole 110. In instances where a cylindrical shape, which has a single continuous wall, for body 302 is not implemented, it is to be understood that exterior surface 304 and interior surface 306 may refer to multiple walls that intersect to form a closed surface.

As shown in FIG. 3, seal 300 further includes a first flange 308 and a second flange 310 formed with body 302 of seal 300. First flange 308 and second flange 310 are disposed on opposing ends of body 302 in axial alignment, where an axis A extends through body 302. First flange 308 and second flange 310 may be sized and shaped differently than one another. For example, first flange 308 and second flange 310 may have a generally circular shape. In addition, first flange 308 and second flange 310 may comprise a disc-shape. In some instances, first flange 308 may have a smaller diameter than second flange 310. That is, second flange 310 may extend at a farther radial distance away from body 302 and may thereby prevent water from entering a fastener hole. More specifically, a larger second flange 310 may shed water farther away from the fastener hole created by the fastener used to connect bracket 100 to a surface.

Compared to conventional washers regarding the prevention of seepage of water, seal 300 may decrease the likelihood in which water enters around or through the fastener hole. That is, conventional washers may have multiple points or areas whereby water may enter or is permitted to enter. The inclusion of an elongated body 302 disposed between first flange 308 and second flange 310, water that may otherwise enter on an underneath side of a washer, for instance along first surface 114 of second member 104, may shed away from the fastener hole, along body 302 of seal 300, and out along second surface 204 of second member 206. That is, in instances where counterbores are used and a washer sits therein, or a washer sits on directly on a surface, water may still enter both where the fastener contacts an upper surface of the water, and in addition, where the washer contacts the surfaces upon which the washer is resting.

First flange 308 and second flange 310 may extend in a radially outward direction away from body 302. The respective thicknesses of first flange 308 and second flange 310 may vary according to different applications, and may be similar or different in relation to one another.

Figure 4:
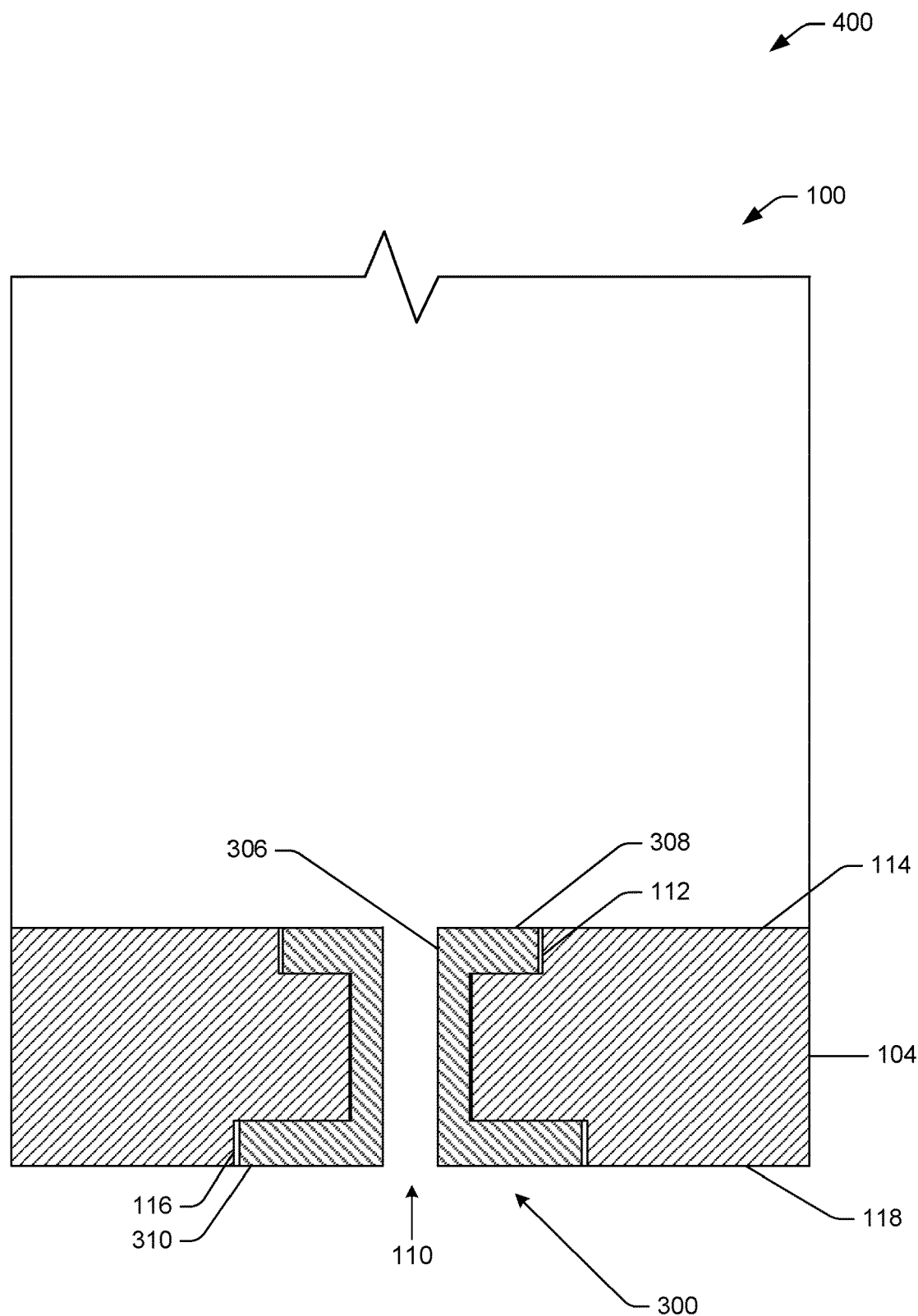
FIG. 4 illustrates a cross-sectional view of the seal of FIG. 3 situated in the bracket of FIGS. 1 and 2 according to an embodiment of the application.

FIG. 4 illustrates a cross-sectional view 400 showing seal 300 disposed in hole 110 of bracket 100. As stated above, to permit seal 300 to be disposed inside hole 110, seal 300 may be manufactured of a flexible material to permit compression to an extent that an end of the seal may be forced through hole 110.

With reference to the previous figures, first flange 308 may be positioned within first counterbore 112. Similarly, second flange 310 may be positioned within second counterbore 116. While first flange 308 and second flange 310 are shown as not occupying an entire area of first counterbore 112 and second counterbore 116, respectively, a gap has been included for illustrative purposes. Accordingly, in some embodiments, there may exist no gap, or a minimal gap, such that first flange 308 and second flange 310 occupy substantially all of the area of their respective counterbores.

When positioned inside first counterbore 112 or second counterbore 116, first flange 308 and second flange 310 may be substantially flush with first surface 114 and second surface 118, respectively. That is, a depth of first counterbore 112 and second counterbore 116 may correspond in size to a thickness of first flange 308 and second flange 310, respectively. As first counterbore 112 and second counterbore 116 contain first flange 308 and second flange 310, second surface 118 of bracket 100, via second member 104 may be in flush relationship with a flashing (discussed later). This flush relationship may reduce wear on seal 300 by minimizing the load on seal 300. However, in other instances, the thickness of first flange 308 and second flange 310 may be sized slightly larger than the respective counterbores (112, 116) such that when a fastener is supplied and tightened, the thickness thereof is reduced under compression, forming a tighter fitting seal, while still permitting flush contact between bracket surface 118 and the flashing under compression.

Moreover, when disposed inside hole 110, seal 300 may structurally retain itself through first flange 308 and second flange 310. That is, first flange 308 and second flange 310 may prevent seal 300 from disengaging or otherwise falling out of hole 110 and/or first counterbore 112 and/or second counterbore 116.

In addition, the diameter (or other perimeter shape) of the first flange 308 and the second flange 310 may be sized to correspond to the diameter (or other corresponding perimeter shape) of the first counterbore 208 and second counterbore 210, respectively. Seal 300 may be shaped and sized to conform to the shape and size of hole 110 of second member 104.

After positioning seal 300 in hole 110, a fastener (not shown) may be disposed adjacent interior surface 306, such that a head of the fastener contacts first surface 114 of second member 104 and/or first flange 308 of seal 300. Thereafter, the fastener may be tightened or otherwise secured to attach bracket 100 to a structure.

As indicated above, second flange 310 and second counterbore 116 may be sized larger than first flange 308 and first counterbore 112, respectively. Thus, if water permeates between the adjacent surfaces of bracket 100 and seal 300, the water may simply shed down along a lengthwise direction, or elongated portion, of body 302 and out second counterbore 116, further away from the fastener hole. Accordingly, by having a larger diameter second flange 310 and counterbore 116, water may be discarded further away from the fastener hole created by fastener. Moreover, a flat lower surface of flange 310 may allow flush contact between surface 118 of bracket 100 and/or flange 310 and the roof surface to which it is attached. As such, the bracket 100 may prevent moisture from entering around a base of the bracket 100 more easily.

Figure 5:
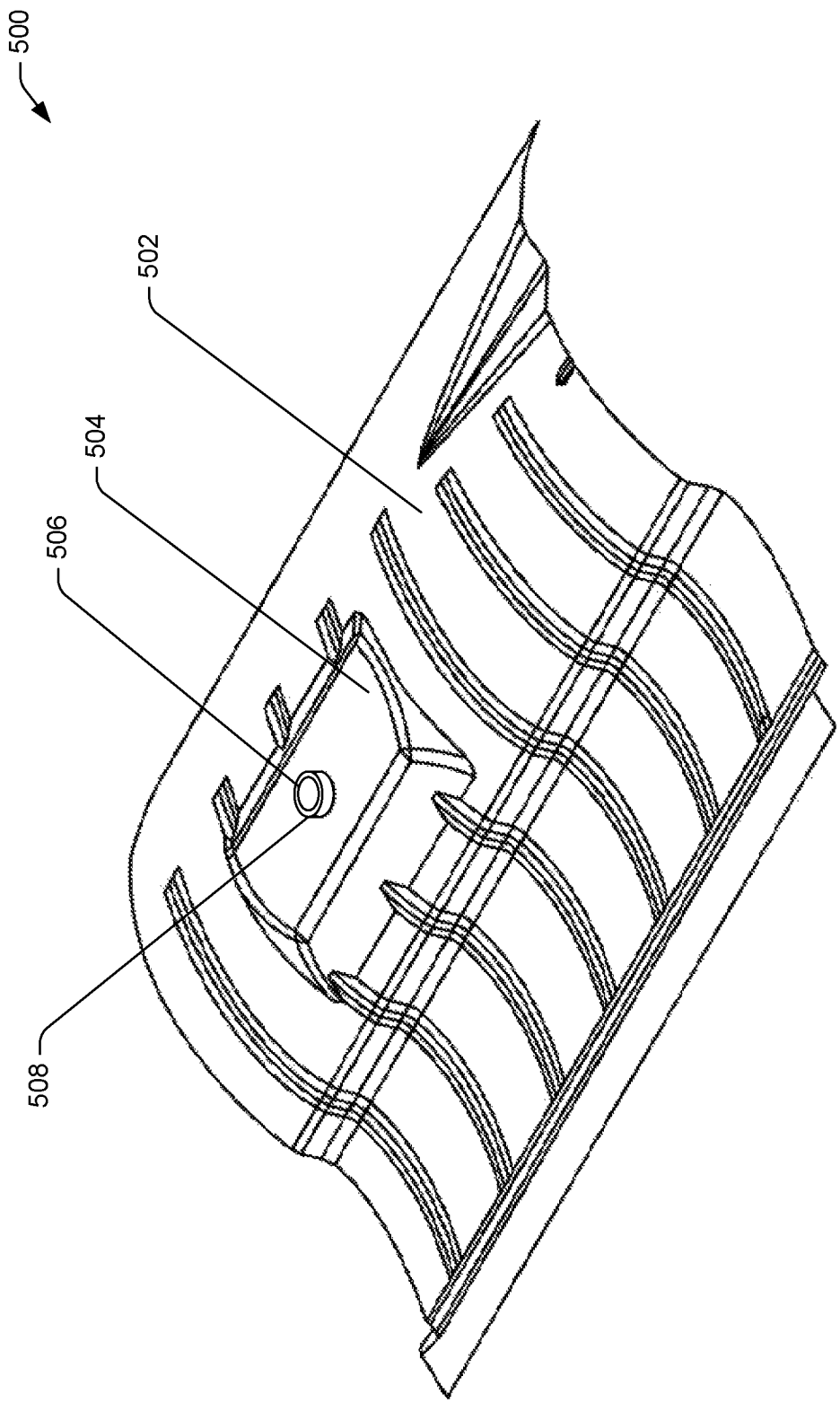
FIG. 5 illustrates a perspective view of flashing of an example tile replacement roof racking system according to an embodiment of the application.

FIG. 5 illustrates a perspective view of flashing 500 (for S Tile replacement) implemented in the roof racking system according to an embodiment of the instant application. Flashing 500 may generally have a rectangular shape, however, other shapes are also envisioned. In addition, when more than one flashing 500 is implemented, features of flashing 500 permit other flashings to connect thereto. Accordingly, a roof racking system may comprise multiple flashings 500 linked, connected, or joined together.

Flashing 500 may have a surface 502 having a mounting portion 504 that may assist in supporting flashing 500. Mounting portion 504 may be embossed into surface 502.

Mounting portion 504 may be substantially planar to permit a watertight seal with bracket 100 and seal 300. Further included within mounting portion 504 is opening 506 via which a fastener passes to secure flashing 500 to the roof surface. Opening 506 may be disposed within an extruded portion 508 that extends above mounting portion 504. Extruded portion 508 may further be used to seat bracket 100. That is, interior surface 306 of seal 300 may rest around an outside perimeter of extruded portion 508 such that hole 110 is aligned with opening 506. In addition, extruded portion 508 may assist in preventing water from entering a fastener hole of a fastener used to support bracket 100 and flashing 500.

However, alternatively, and in some instances, flashing 500 may not include extruded portion 508 extending from mounting portion 504. In such instances, opening 506 may still be included on mounting portion 504 to allow a fastener to pass therethrough.

When in use with flashing 500, bracket 100 is in contact with flashing 500, and particularly mounting portion 504. More specifically, second surface 118 of second member 202 may contact mounting portion 504 such that hole 110 aligns with opening 506. In this position, a fastener may traverse hole 110, having seal 300, and flashing 500 via hole 506 to permit the roof racking system to be secured to a structure. Accordingly, second surface 118 of second member 104 may form a tight and waterproof seal with flashing 500 to prevent water from passing through opening 506. Moreover, in some instances, because of the flush fitting of second flange 310 within second counterbore 116, second surface 118 of second member 104 may be in substantial contact with flashing 500. Alternatively, to permit a watertight seal, mounting portion 504 may mirror or correspond to surface 118 of bracket 100.

In addition, in some instances, second flange 310 may be disposed inside second counterbore 116, offset from second surface 118, such that contact may form between second member 104 and mounting portion 504. In such instances, by forming a metal-to-metal contact, for instance, between bracket 100 and mounting portion 504, wear on seal 300 may be reduce. Accordingly, in some instances, bracket 100 may carry a greater portion of the load borne by bracket 100, rather than seal 300.

Figure 6:
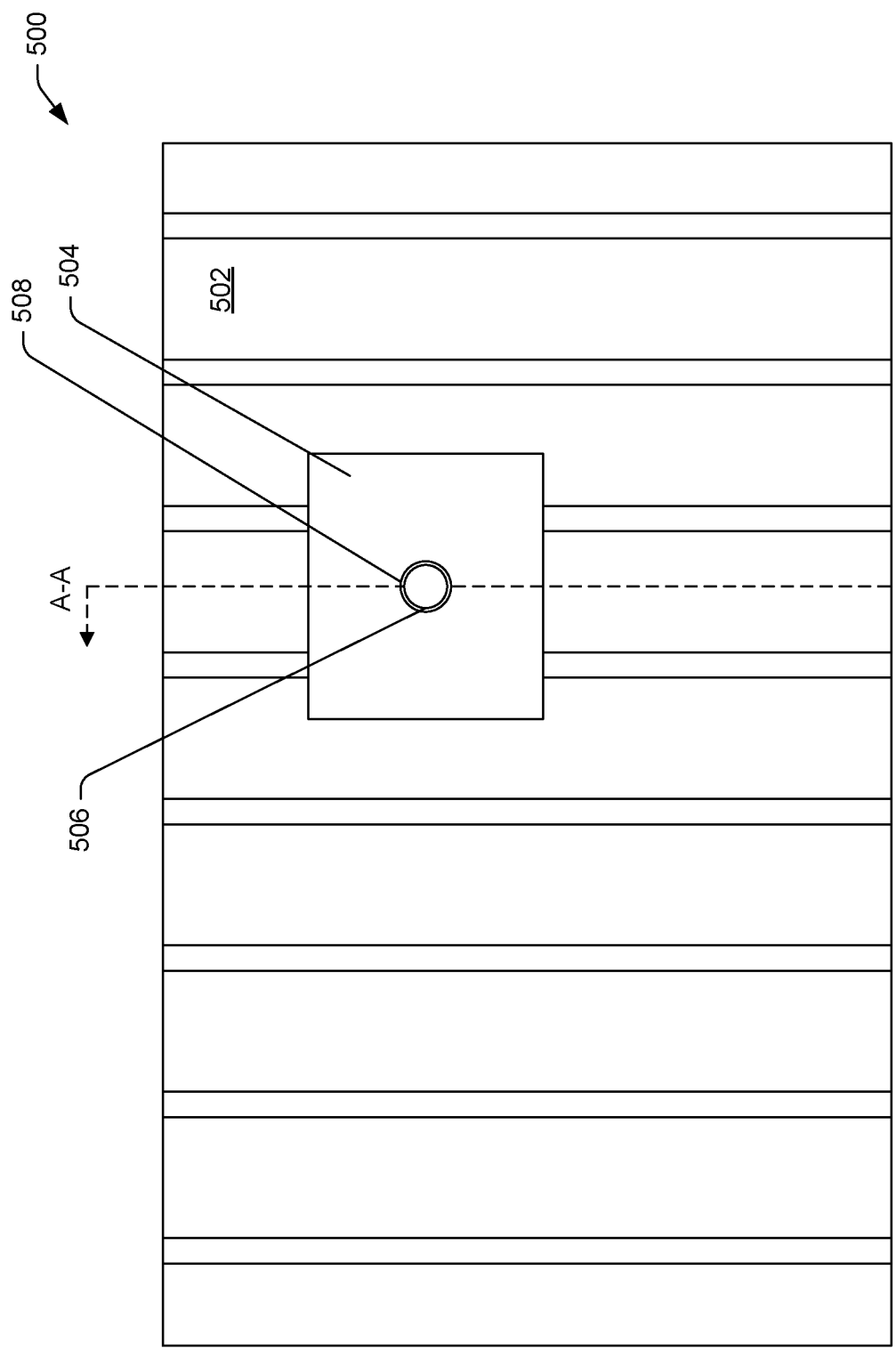
FIG. 6 illustrates a top-view of the flashing of FIG. 5 according to an embodiment of the application.

FIG. 6 illustrates a top view of flashing 500 implemented in the roof racking system. As shown, flashing 500 includes a surface having a mounting portion 504 and an opening 506 disposed within extruded portion 508, through flashing 500. As referenced in FIG. 5, in some instances, mounting portion 504 may simply be planar without an extruded portion 508.

Figure 7:
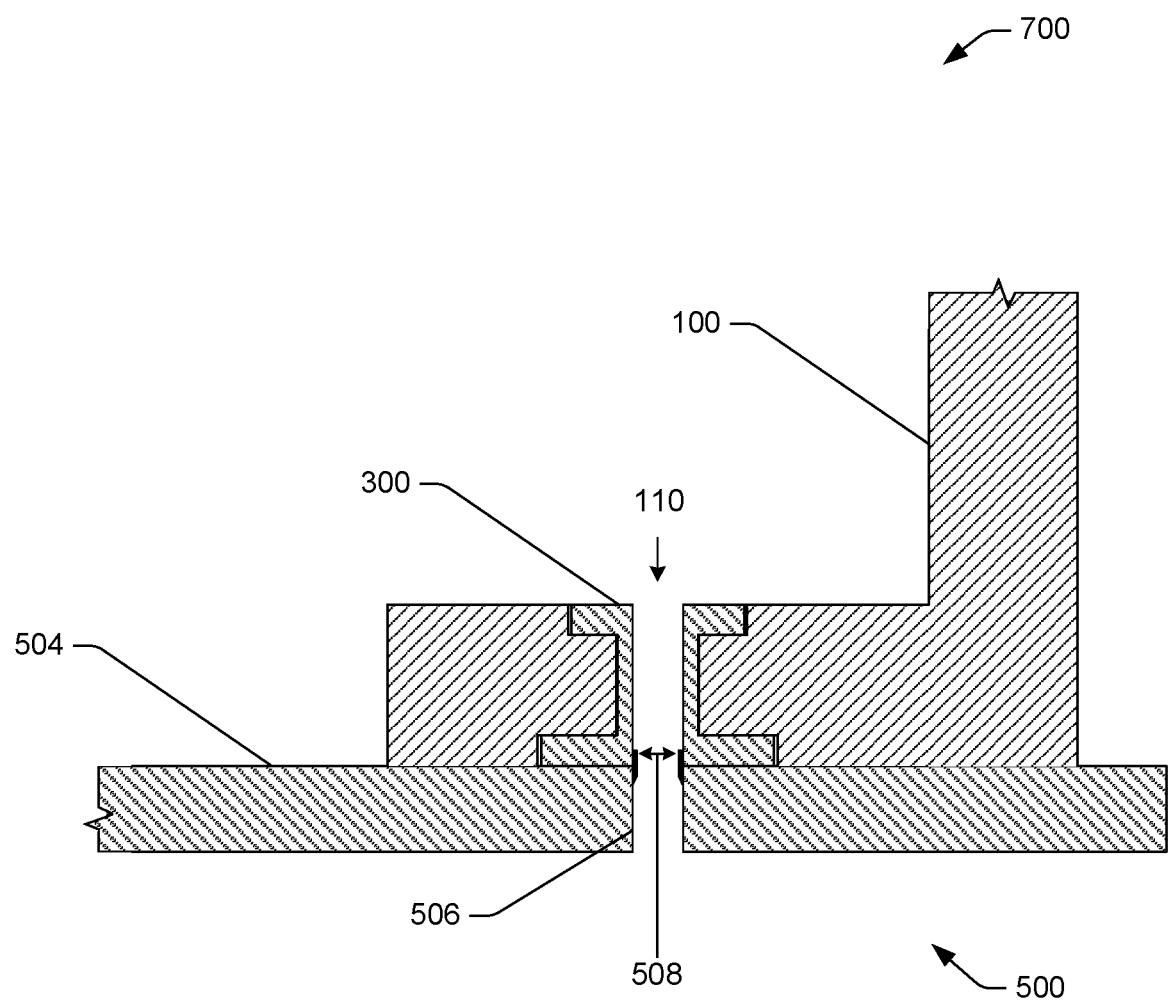
FIG. 7 illustrates a cross-sectional view of the assembled system of the flashing of FIG. 6 and the bracket of FIG. 1, according to an embodiment of the application (no fastener is shown).

FIG. 7 illustrates a cross-sectional view 700 of flashing 500 along line A-A of FIG. 6. Bracket 100 may be in contact with flashing 500, and particularly, mounting portion 504, such that opening 506 aligns with hole 110 of bracket 100. Seal 300 may rest in contact with extruded portion 508 of mounting portion 504. Note that extruded portion 508 may extend above mounting portion 504 in various configurations. Moreover, while bracket 100 is shown at one orientation with respect to cross-sectional view 700, bracket 100 may be orientated other positions around hole 506.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A mounting bracket for mounting a solar panel module, the mounting bracket comprising:
    a first portion including an opening that extends therethrough; and
    a second portion continuous with the first portion, the second portion including:
        a first surface and a second surface opposite the first surface, a thickness of the second portion defined from the first surface to the second surface,
        a hole extending through the thickness of the second portion,
        a first counterbore of a first depth formed around the hole in the first surface of the second portion, and
        a second counterbore of a second depth formed around the hole in the second surface of the second portion,
    wherein the first depth and the second depth combined are less than the thickness of the second portion, and
    wherein the first portion and the second portion are oriented continuously in an L-shape, such that the second portion is shorter in length than the first portion.

2. The mounting bracket according to claim 1, wherein the opening in the first portion is an elongated slot.

3. The mounting bracket according to claim 1, wherein a diameter of the first counterbore is smaller than a diameter of the second counterbore.

4. The mounting bracket according to claim 1, wherein the hole is sized to accommodate a self-retaining seal therein, the seal having an aperture therethrough sized to accommodate a fastener to secure the bracket to a surface.

5. A mounting bracket for mounting a solar panel module to a mounting surface, the mounting bracket comprising:
    a first portion that extends in a first direction; and
    a second portion continuous with the first portion, the second portion extending in a second direction transverse to the first direction, and the second portion including:
        a first surface and a second surface opposite the first surface, a thickness of the second portion defined from the first surface to the second surface,
        a hole extending through the thickness of the second portion,
        a first counterbore of a first depth formed around the hole in the first surface of the second portion, and
        a second counterbore of a second depth formed around the hole in the second surface of the second portion.

6. The mounting bracket according to claim 5, wherein the first portion and the second portion are oriented continuously in an L-shape.

7. The mounting bracket according to claim 5, wherein the first portion includes an opening through a thickness thereof, the opening accommodating a fastener to attach the solar panel module.

8. The mounting bracket according to claim 7, wherein the opening in the first portion is an elongated slot.

9. The mounting bracket according to claim 5, wherein a diameter of the first counterbore is smaller than a diameter of the second counterbore.

10. The mounting bracket according to claim 5, further comprising a seal shaped to fit within the first counterbore and the second counterbore and extend through the hole,
    wherein, upon insertion of the seal into the second portion of the mounting bracket, the seal is self-retaining within the second portion.

11. The mounting bracket according to claim 10, wherein the seal is sized such that, upon insertion of the seal into the second portion of the mounting bracket, exterior surfaces of the seal are flush with the corresponding first surface of the second portion and the corresponding second surface of the second portion.

12. The mounting bracket according to claim 5, wherein, the first portion and the second portion are oriented such that, upon mounting the mounting bracket to the mounting surface, the first portion extends vertically away from the mounting surface, and the second portion extends along a direction of extension of the mounting surface such that the second surface of the second portion abuts the mounting surface.

13. The mounting bracket according to claim 5, wherein the counterbore has a diameter that is larger than a maximum outer cross-sectional dimension of the first cavity.

\* \* \* \* \*